United States Patent
Joly et al.

(10) Patent No.: US 8,403,097 B2
(45) Date of Patent: Mar. 26, 2013

(54) MOVEMENT LIMITING ANTI-VIBRATION ASSEMBLY

(75) Inventors: Jerome Joly, Grand Rapids, MI (US); Franck Larmande, Grand Rapids, MI (US); Toan Nguyen, Kentwood, MI (US); Mike Bernhard, Grand Rapids, MI (US)

(73) Assignee: Paulstra CRC, Grand Rapids, MI (US)

( * ) Notice: Subject to any disclaimer, the term of this patent is extended or adjusted under 35 U.S.C. 154(b) by 185 days.

(21) Appl. No.: 13/089,963

(22) Filed: Apr. 19, 2011

(65) Prior Publication Data

US 2012/0267184 A1   Oct. 25, 2012

(51) Int. Cl.
*B60K 1/00* (2006.01)
*F16F 5/00* (2006.01)

(52) U.S. Cl. .............. 180/291; 180/299; 267/140.13

(58) Field of Classification Search .......... 180/291, 180/299, 300; 267/140.13, 141; 123/195 R, 123/195 A; 248/562, 566, 636, 638, 674
See application file for complete search history.

(56) References Cited

U.S. PATENT DOCUMENTS

| | | | |
|---|---|---|---|
| 4,693,217 A * | 9/1987 | Beer | 123/195 A |
| 4,905,956 A * | 3/1990 | Zemlicka et al. | 248/562 |
| 6,408,974 B1 * | 6/2002 | Viduya et al. | 248/678 |
| 6,698,733 B1 * | 3/2004 | Larmande | 267/293 |
| 6,742,619 B2 * | 6/2004 | Farbotnik et al. | 180/299 |
| 6,782,981 B2 * | 8/2004 | Larmande | 267/136 |
| 6,955,343 B2 * | 10/2005 | Compain | 267/140.11 |
| 7,575,088 B2 * | 8/2009 | Mir et al. | 180/297 |
| 8,002,252 B2 * | 8/2011 | Howorth et al. | 267/140.4 |
| 8,025,015 B1 * | 9/2011 | Kennedy, Sr. | 248/638 |
| 2004/0021259 A1 * | 2/2004 | Visage et al. | 267/140.13 |
| 2005/0001364 A1 * | 1/2005 | Visage et al. | 267/140.4 |
| 2007/0178258 A1 * | 8/2007 | Petit et al. | 264/248 |

FOREIGN PATENT DOCUMENTS

| | | |
|---|---|---|
| EP | 1 628 040 | 2/2006 |
| EP | 2 282 076 | 2/2011 |
| WO | WO 2008/152284 | 12/2008 |

* cited by examiner

*Primary Examiner* — J. Allen Shriver, II
*Assistant Examiner* — James M Dolak
(74) *Attorney, Agent, or Firm* — Miller, Matthias & Hull LLP (57) ABSTRACT

An anti-vibration assembly is disclosed including a rigid bracket fixed to a vehicle powertrain, a vehicle body and an anti-vibration mount including: a first tubular mounting member, in which the bracket is received; a second mounting member fixed to vehicle body; an elastomer body connecting the first mounting member to the second mounting member; and a rigid strap including two legs and a top. The second mounting member is fitted in the two legs of the strap in the first direction upwards and is pressed by said two legs directly on the vehicle body in said first direction. The strap further includes a bridge portion joining the two legs under the bracket.

11 Claims, 15 Drawing Sheets

MOVEMENT LIMITING ANTI-VIBRATION ASSEMBLY

FIELD OF THE DISCLOSURE

This invention relates to movement limiting anti-vibration assemblies.

More particularly, the invention relates to an anti-vibration assembly including:
- a vehicle powertrain;
- a rigid bracket fixed to the vehicle powertrain and extending from the vehicle powertrain up to a free end;
- a vehicle body;
- and an anti-vibration mount connecting said vehicle powertrain and said vehicle body for the purposes of shock absorption and support, said anti-vibration mount including:
  - a first rigid mounting member having a substantially tubular form, in which the bracket is received, said bracket including an intermediate portion close to the vehicle powertrain and an inserted portion which is close to the free end of the bracket and is fitted in said first mounting member;
  - a second rigid mounting member fixed to vehicle body;
  - an elastomer body connecting the first mounting member to the second mounting member and capable of supporting a static load (for example part of the weight of the powertrain of the vehicle) applied to the first mounting member in a first, substantially vertical direction and of allowing relative movements between the first and second mounting members at least in the first direction and in second and third directions, wherein the first, second and third directions are substantially perpendicular to each other;
  - a rigid strap including a least two legs and a top joining the two legs, said two legs having respective fixing tabs which extend opposite to one another and which are fixed to the vehicle body, said first mounting member being disposed underneath the top of the strap and being capable of cooperating by abutment with said top of the strap in the first direction upwards, and said first mounting member being disposed between the two legs of the strap and being capable of cooperating by abutment with said two legs in the second direction, said two legs and top extending in the third direction between a fore rim and a rear rim.

It should be noted that, as understood herein, the vehicle body means the vehicle body stricto sensu and any member which is rigid with said vehicle body stricto sensu. Similarly, the powertrain means the powertrain stricto sensu and any member which is rigid with said powertrain stricto sensu.

BACKGROUND OF THE DISCLOSURE

One example of such anti-vibration mount is disclosed for instance in EP-A-2 282 076, wherein the rigid strap is a folded and stamped metal piece and the second mounting member is a plastic subassembly borne by a crimped metal support member which is itself adapted to be fixed on the vehicle body.

Such anti-vibration mount may be expensive to manufacture, and one particular object of this invention is to overcome this drawback.

SUMMARY OF THE DISCLOSURE

To this end, according to the invention, in an anti-vibration mount of the type in question, the second mounting member is fitted in the two legs of the strap in the first direction upwards and is pressed by said two legs directly on the vehicle body in said first direction, the second mounting member being immobilized by said two legs in said first, second and third directions on the vehicle body, and the strap further includes a bridge portion joining the rear rims of the two legs at a distance under the intermediate portion of the bracket, said bridge being adapted to cooperate by abutment with the intermediate portion of the bracket in the first direction downwards.

As a result of these provisions, the anti-vibration mount is simpler and less costly compared to prior art.

In various embodiments of the anti-vibration mount according to the invention, one or more of the following provisions may be used:
- the second mounting member is made out of plastic material;
- the strap is adapted to be molded in a two part mold without any movable tray in each part of the mold;
- the strap is molded out of a material chosen from aluminum based alloys and plastics;
- the elastomer body includes a tongue of elastomer which is interposed between the intermediate portion of the bracket and the bridge of the strap;
- the second mounting member includes a base which is pressed against the vehicle body by said strap and a top portion which is clipped to said base, said top portion of the second mounting member being at least partly overmolded by the elastomer body and bonded to said elastomer body;
- the second mounting member defines a hydraulic working chamber with the elastomer body, an elastomer bellows is borne by the base of the second mounting member and defines a hydraulic compensation chamber, said compensation chamber being separated from the working chamber by a rigid partition which is sandwiched between the base and the top portion of the second mounting member, and said compensation chamber and working chamber being filled with liquid and communicating through a throttled passageway;
- the second mounting member has a rear side facing the bridge of the strap, two lateral sides facing the legs of the strap and a front side opposite the rear side, the top portion being clipped to the base of the second mounting member by clips which are disposed on said rear, front and lateral sides of the second mounting member, the clips being elastically movable between a locked position where said clips secure the top portion to the base and a release position where said clips enable separation of the top portion and the base, and the clips of the rear and lateral sides being held in the locked position respectively by the bridge and legs of the strap;
- the clips of the front side are held in the locked position by elastic tongues belonging to the second mounting member;
- said elastic tongues engage under a flange belonging to said clips of the front side;
- the strap has a front wall facing the free end of the bracket and the elastomer body has a front elastomeric stop interposed between the free end of the bracket and the front wall of the strap, whereby the bracket can come in abutment against the front wall of the strap with interposition of the rear elastomeric stop in the third direction.

BRIEF DESCRIPTION OF THE DRAWINGS

Further characteristics and advantages of the invention will become apparent on reading the following description of two of its embodiments, given as non-limitative examples, in relation to the attached drawings.

On the drawings.

DETAILED DESCRIPTION OF THE DISCLOSURE

In the various figures, the same reference denotes identical or similar components.

Figure 1:
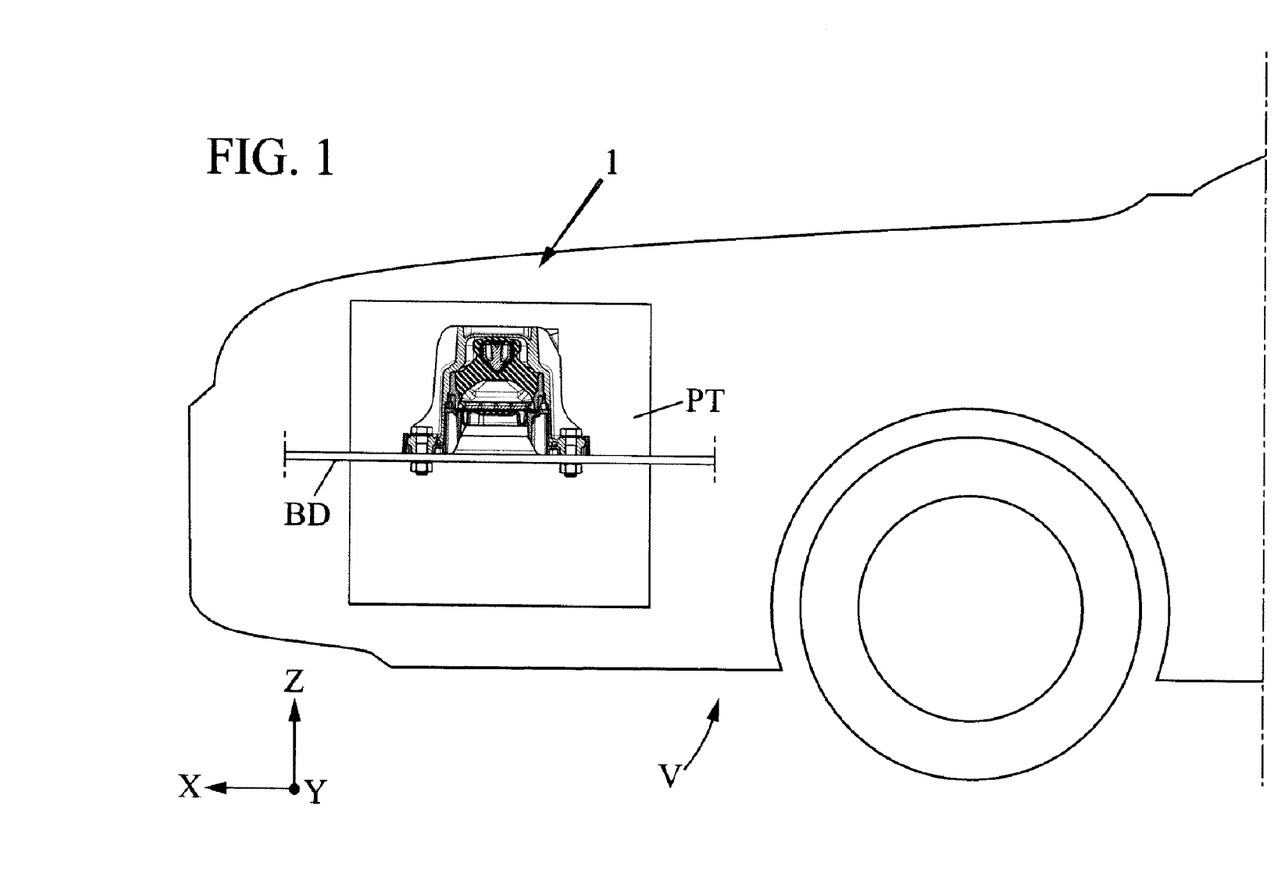
FIG. 1 is a schematic drawing of a vehicle including an antivibration assembly according to one embodiment of the invention.
Figure 2:
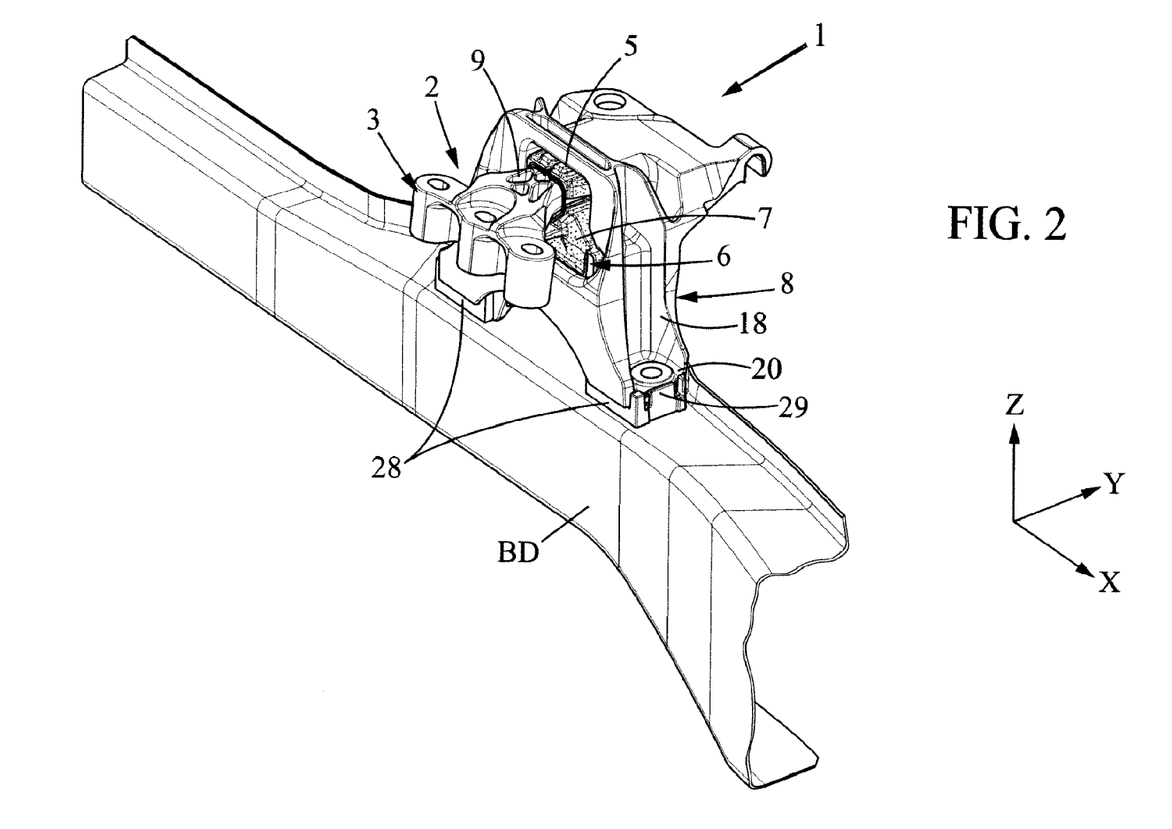
FIGS. 2 and 3 are two prospective views of part of the antivibration assembly of the FIG. 1, seen in two opposite directions.
Figure 3:
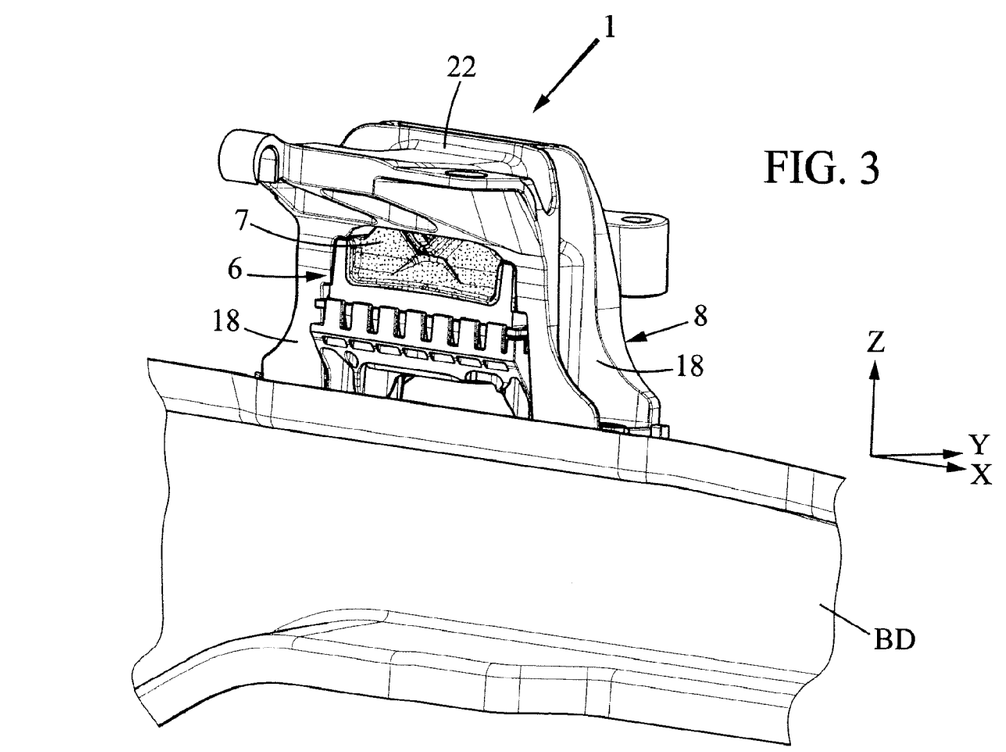
Figure 4:
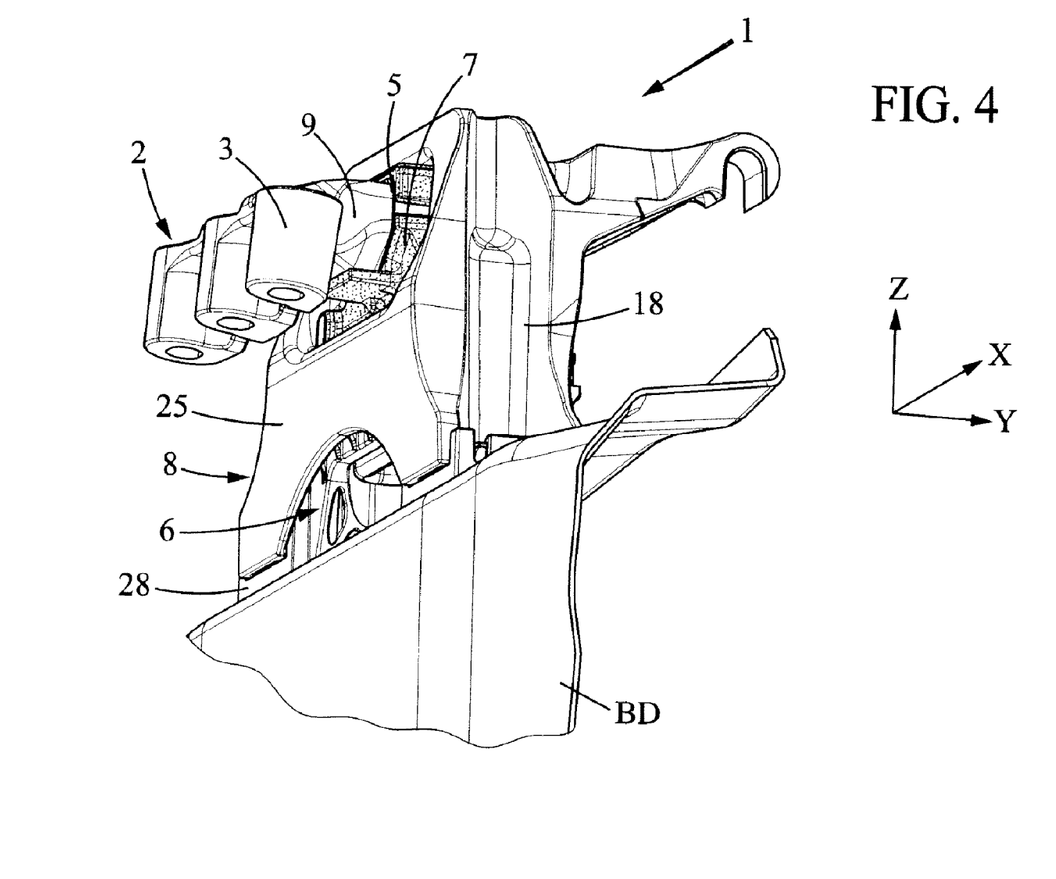
FIG. 4 is a perspective view similar to FIG. 2, seen from another point of view.

FIG. 1 shows an automotive vehicle V having a vehicle body BD and a power train PT which is mounted on the vehicle body BD by several antivibration mounts, including one antivibration mount 1, which connects the vehicle power train PT to the vehicle body BD for the purposes of chock absorption and support and which is shown in more details on the other Figures.

As shown in FIGS. 2-4 and 7, the antivibration assembly includes a rigid bracket 2, which can be for instance molded in an aluminum based alloy and which extends longitudinally in a substantially horizontal third direction Y from a proximal end 3 adapted to be fixed (for instance bolted) to the power train PT up to a free end 4.

The antivibration mount 1 includes:
- a first rigid mounting member 5 having a substantially tubular form and extending along the second direction Y;
- a second rigid mounting member 6 fixed to the vehicle body BD;
- an elastomer body 7 connecting the first mounting member to a second mounting member and capable of supporting the static load of weight of the power train in a first substantially vertical direction Z which is perpendicular to said second direction Y, said elastomer body 7 allowing relative movements between the first and second mounting members in said first and third directions Z, Y as well as in a second direction X which is substantially horizontal and perpendicular to the first and third directions Z,Y;
- and a rigid strap 8, which can be for instance molded out of aluminum based alloy or plastic material.

Figure 5:
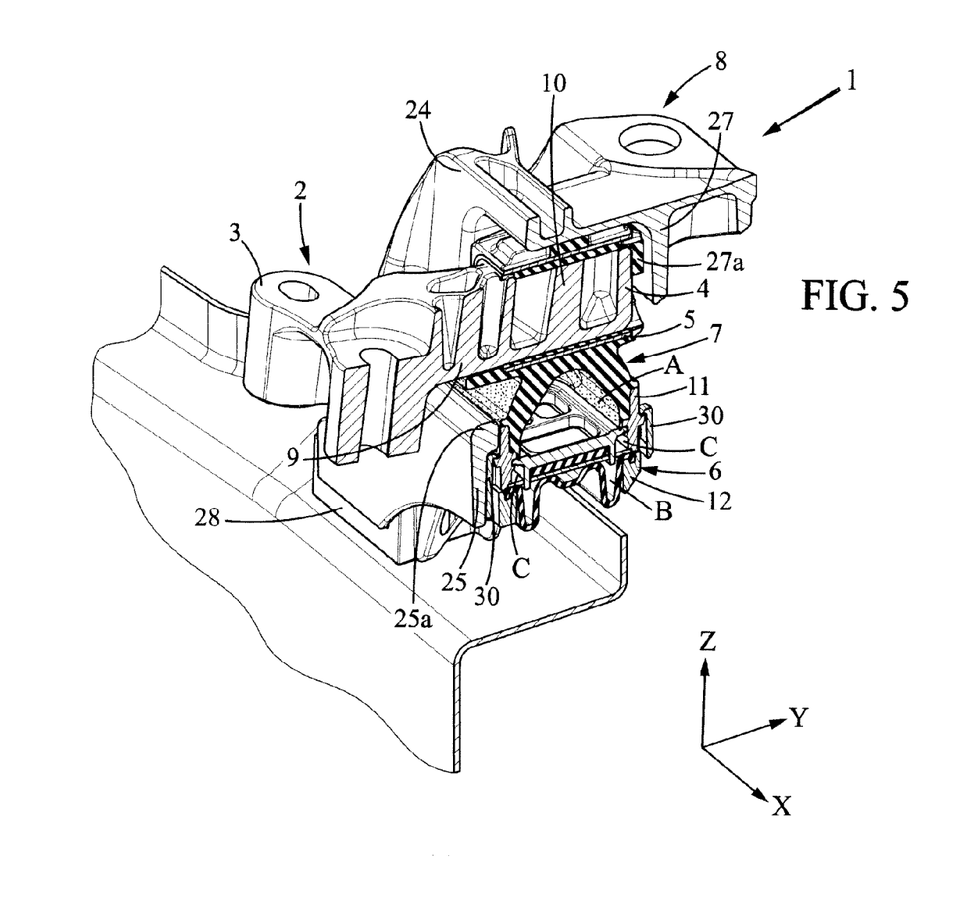
FIG. 5 is a perspective view of the antivibration assembly, with a cross-section along line V-V of FIG. 7.
Figure 6:
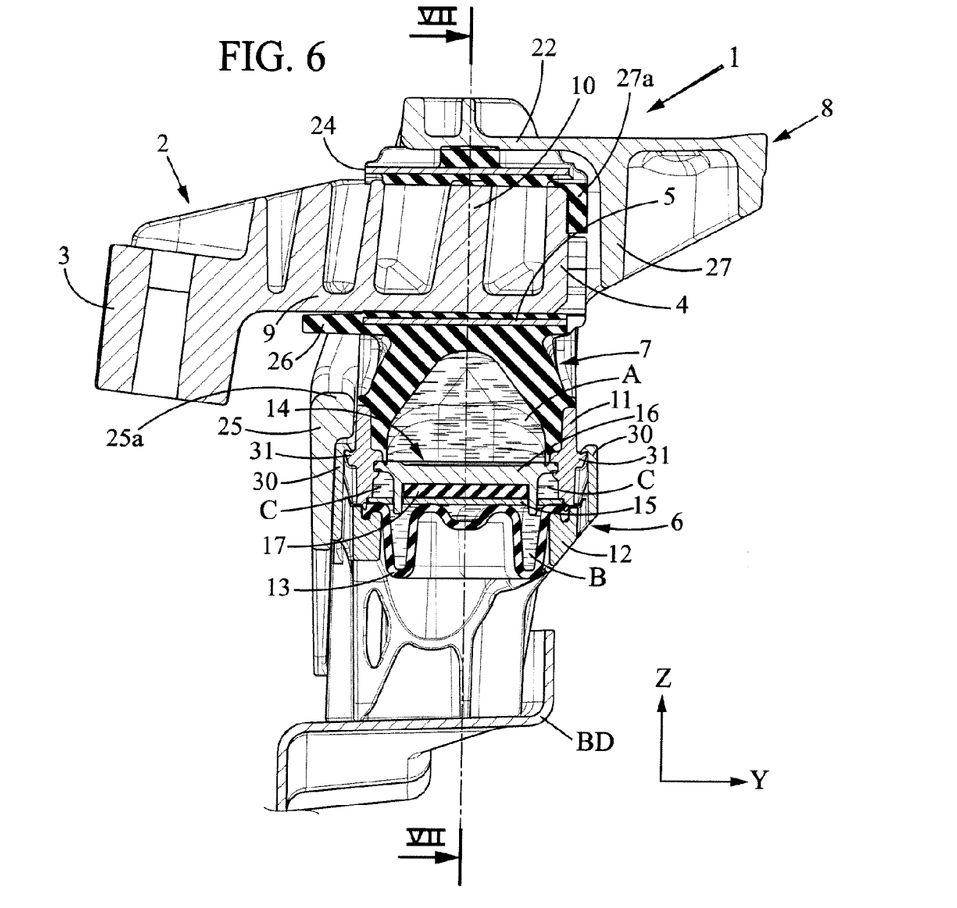
FIG. 6 is an elevation view of the antivibration assembly, seen in cross-section along line V-V of FIG. 7.

As shown more particularly on FIGS. 5 and 6, the bracket 2 may be fitted in a first rigid mounting member 5 in the third direction Y, and said bracket may include:
- an intermediate portion 9 which is close to the proximal end 3 and which is situated outside the first rigid mounting member 5,
- and an inserting portion 10 which is close to the free end 4 of the bracket and which is fitted in said first mounting member 5.

The first mounting member 5 may be for instance made out of rolled sheet metal plate and may be over molded by the elastomer body 7 and bonded to said elastomer body 7. The second mounting member 6 may be for instance molded out of plastic material and may be made in two parts, to with a base 12 and a top portion 11 which are secured together for instance by clipping (See FIGS. 6-7 and 9-12).

The top portion 11 of the second mounting member 6 is overmolded by the elastomer body 7 and bonded to said elastomer body 7.

Figure 7:
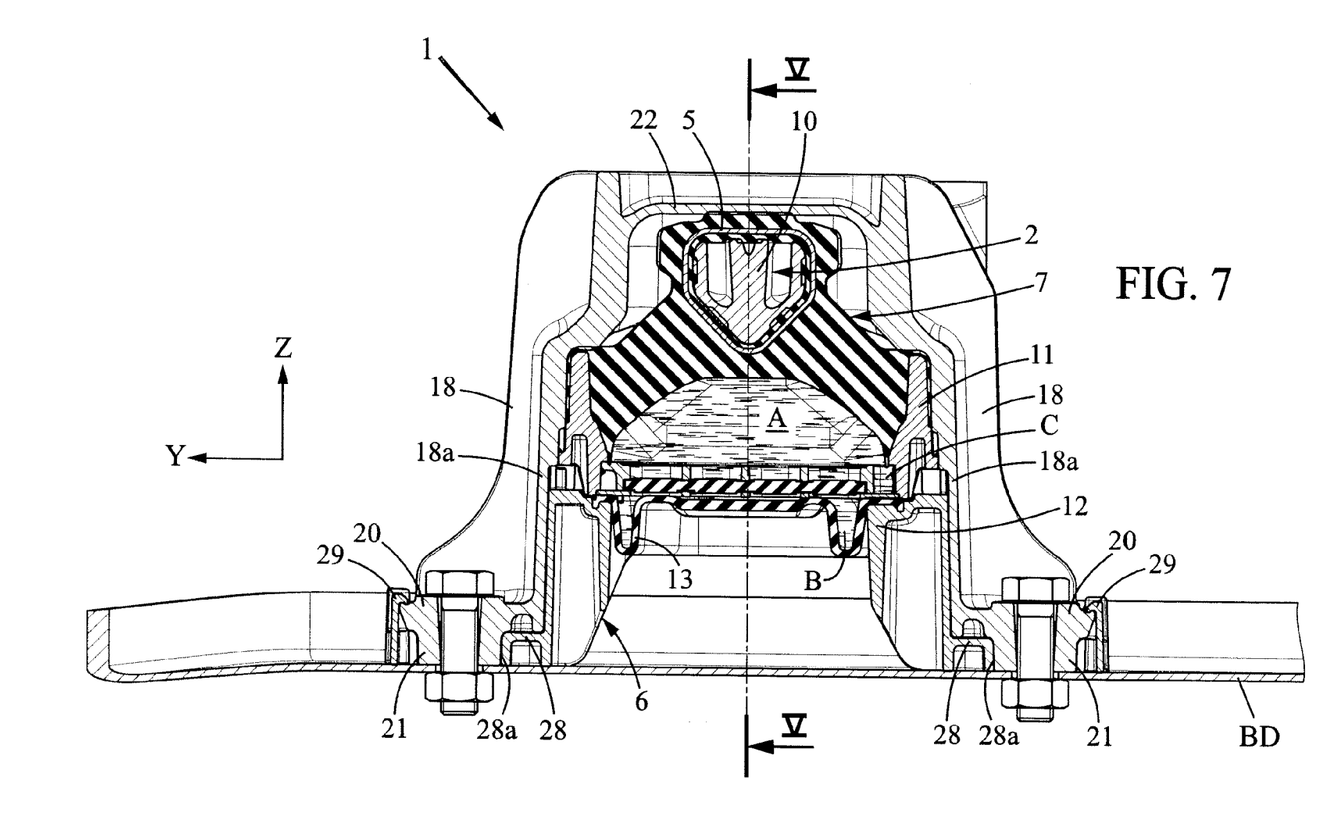
FIG. 7 is a cross-section view, with the cross-section taken along line VII-VII of FIG. 6.
Figure 8:
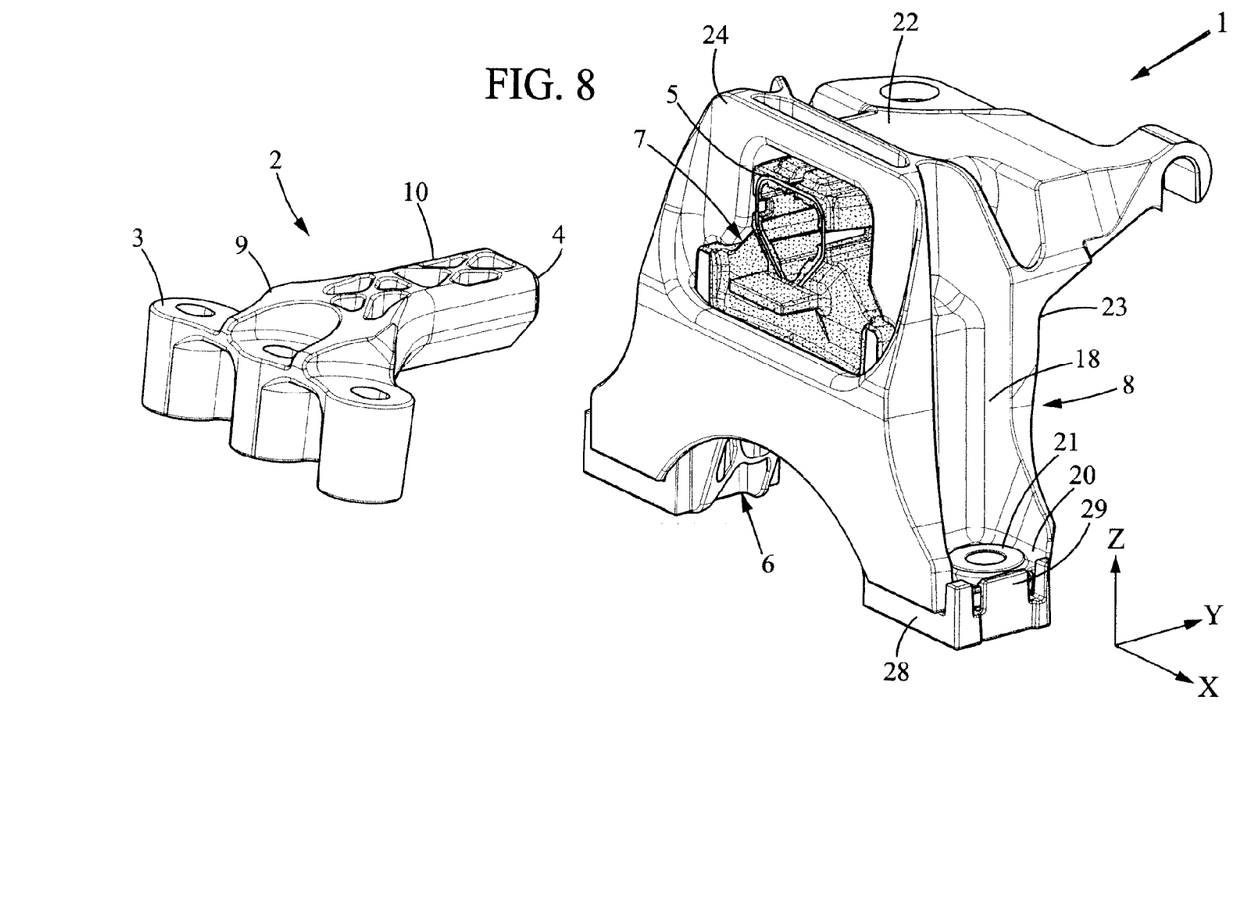
FIG. 8 is an exploded view of part of the antivibration assembly of FIGS. 1-7, showing the bracket extracted from this assembly.

As shown for instance on FIGS. 5-7, the elastomer body 7 defines a hydraulic working chamber A which is filled with liquid, whereas the base 12 of the second mounting member bears an elastomer bellows 13 which defines a hydraulic compensation chamber B filled with liquid, separated from the working chamber A by a rigid partition 14 which is sandwiched between the top portion 11 and the base 12 of the second mounting member.

The elastomer bellows 13 may for instance be pressed between the rigid partition 14 and the base 12 of the second mounting member, along the periphery of said elastomer bellows 13.

In the particular example considered here, as shown for instance on FIGS. 5-7 and 11-12, the rigid partition 14 may define a throttled passageway C communicating with the working chamber A and with the compensation chamber B, and said rigid partition 14 may be made out of a lower metal grid 15 and an upper metal grid 16 between which is disposed an elastomer flap 17 constituting a decoupling valve, known per se.

Figure 9:
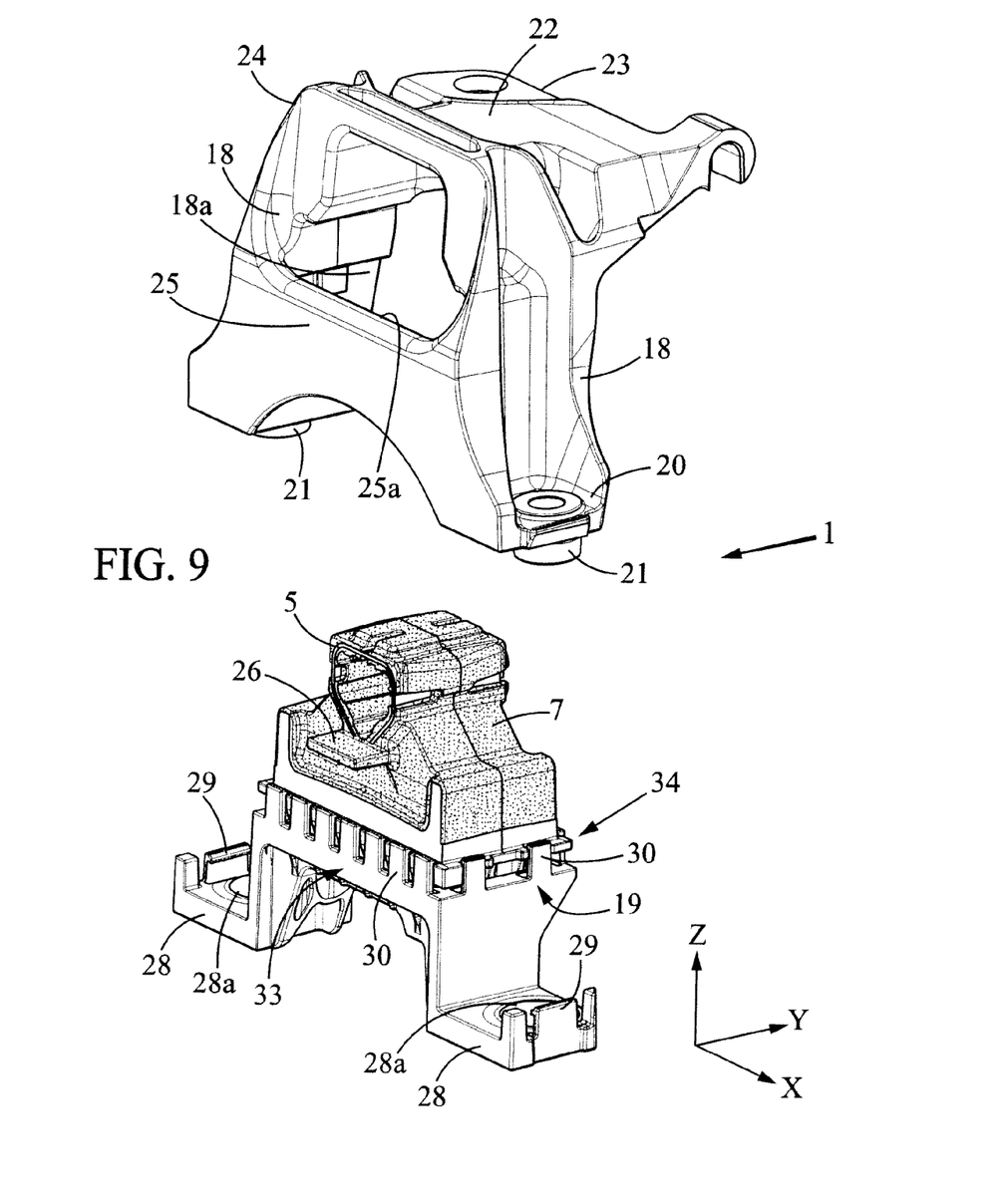
FIGS. 9 and 10 are two exploded views in perspective, seen from two opposite point of views, showing the strap of the antivibration assembly separated from the first and second mounting members and the elastomer body.
Figure 10:
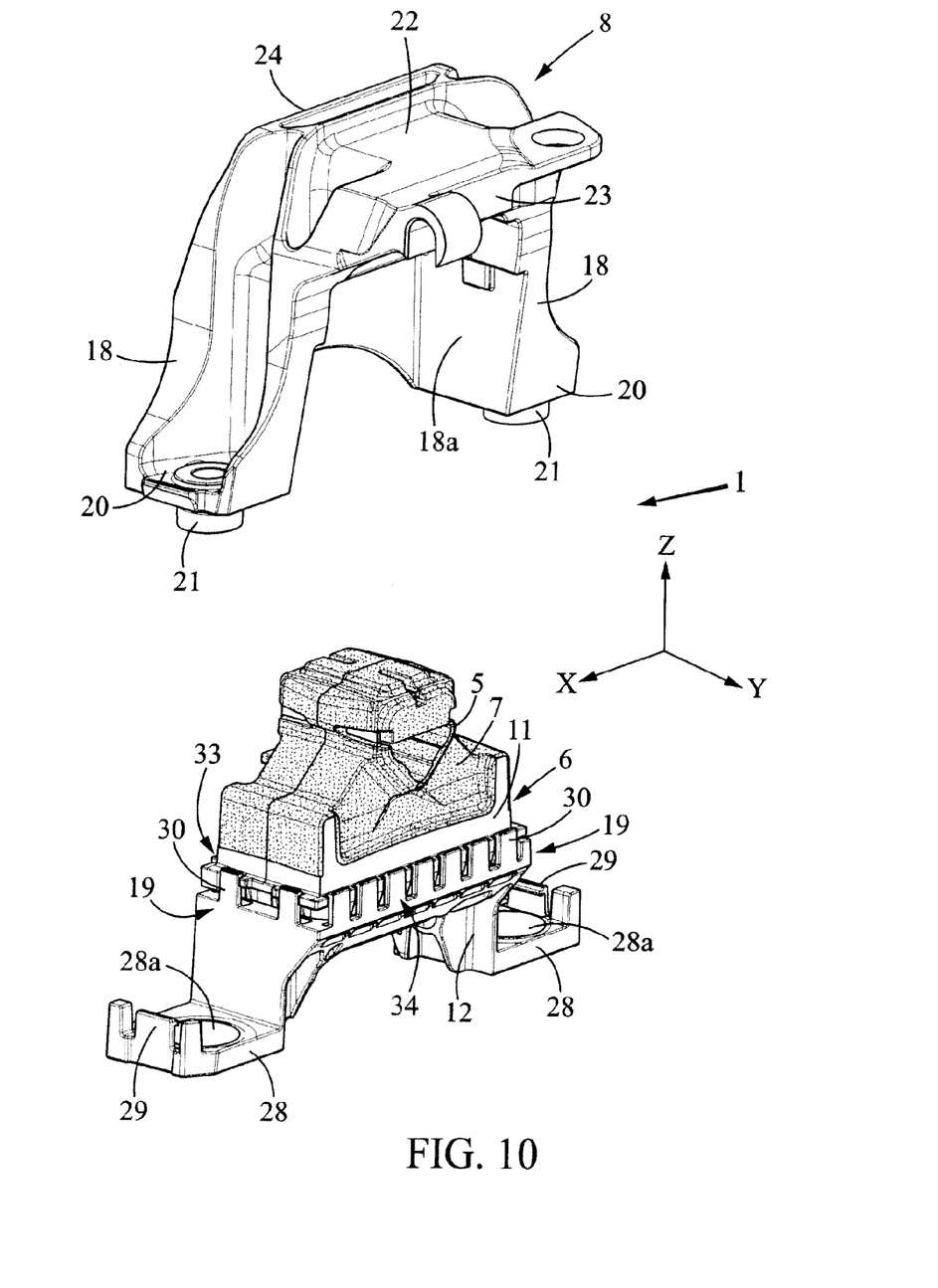
Figure 11:
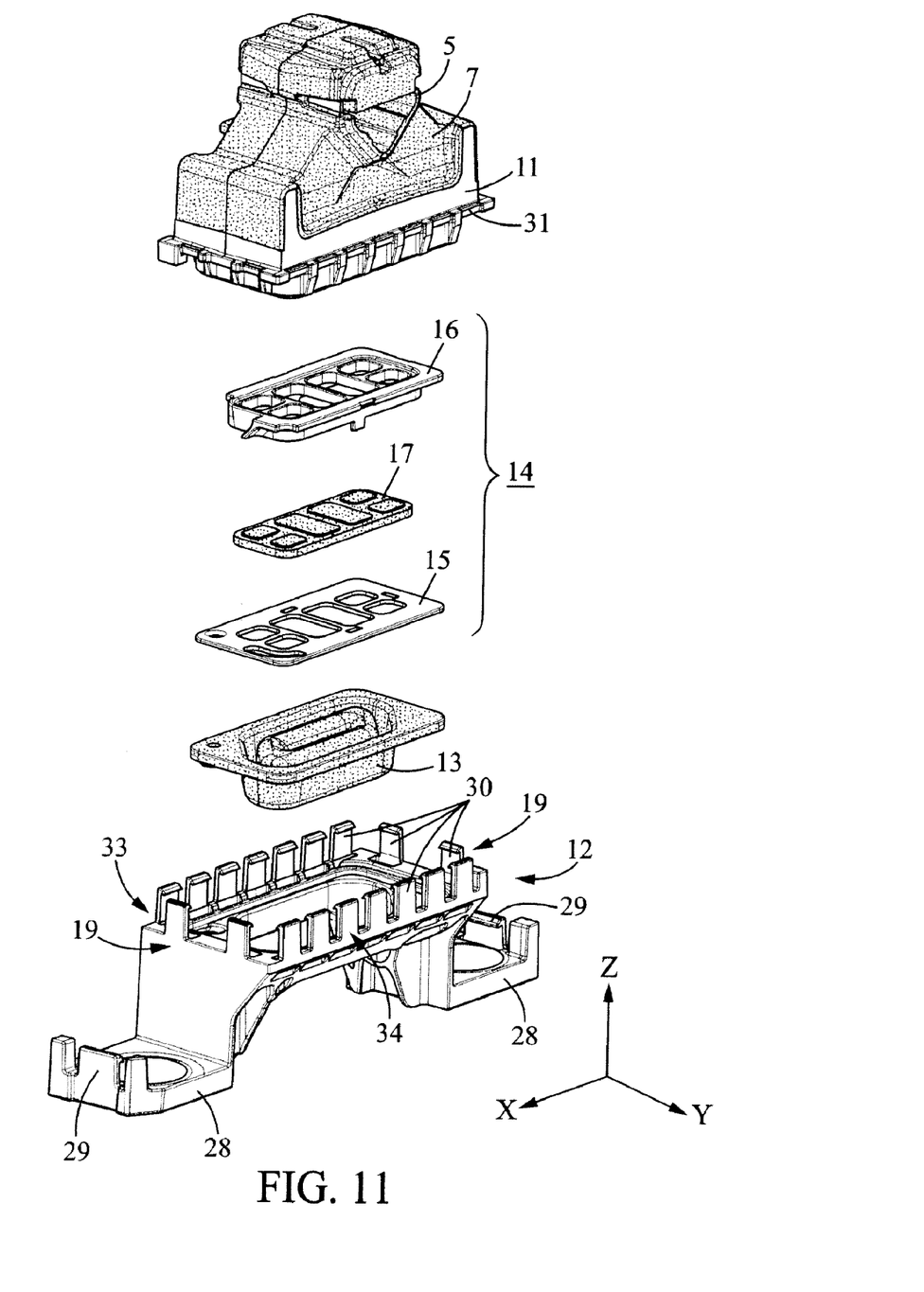
FIGS. 11 and 12 are two exploded views in perspective, seen from two points of views, showing the components of the second mounting member.
Figure 12:
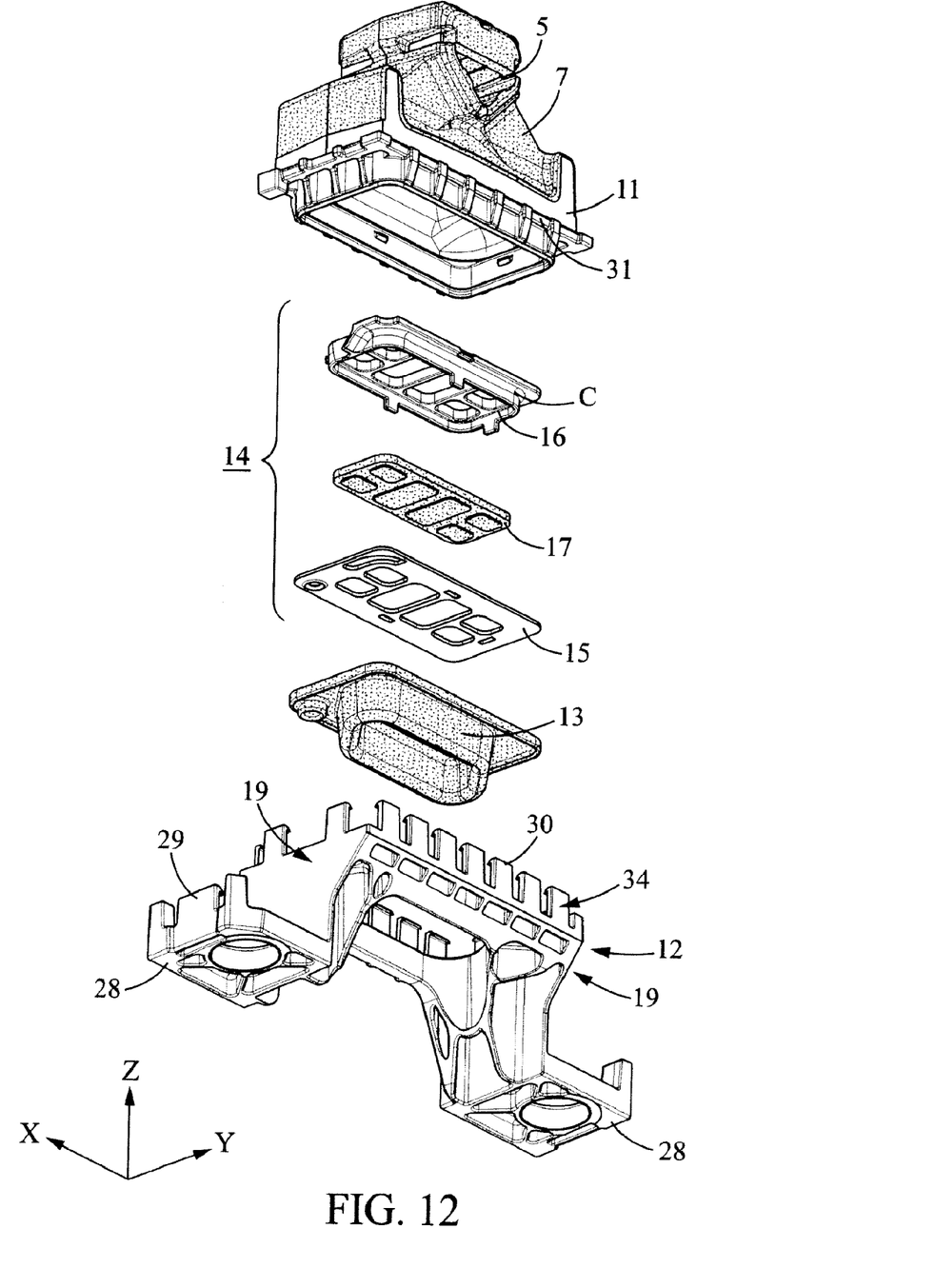

As shown on FIG. 7 and FIGS. 9-10, the rigid strap 8 may include two legs 18 which are disposed facing two lateral sides 19 of the second mounting member 6 in the second direction X. The legs 18 form fixing tabs 20 at their lower ends, said fixing tabs 20 extending opposite to one another and being fixed to the vehicle body for instance by bolting (see FIG. 7). Each of these fixing tabs 20 may include for instance a cylindrical spacer 21 protruding downwards and being pressed directly on the vehicle body BD when the strap 8 is bolted on said vehicle body. At their upper ends, the two legs 18 of the strap 8 are joined by a substantially horizontal top 22. The legs 18 and top 22 extend in the third direction Y between a fore rim 23 and a rear ream 24. The strap 8 further includes a bridge portion 25 which extends in a substantially vertical plane and joins the rear reams 24 of the two legs at a distance under the intermediate portion 9 or the bracket (see for instance FIGS. 4-6). The top rim 25a of the bridge portion 25 is adapted to come into abutment with intermediate portion 9 of the brackets, with interposition of an elastomer tong 26 of the elastomer body 7, so as to limit the movement of the bracket 2 downwards in the first direction Z.

Further, the strap 8 may also include a front wall 27 facing the free end of the bracket, whereas the elastomer body has a front elastomeric stop 27a interposed between the free end 4 of the bracket and the front wall 27 of the strap, whereby the bracket can come in abutment against the front wall of the strap with interposition of the front elastomeric stop 27a in the third direction Y.

It should be noted that the strap is adapted to be molded in a two part mold without any movable tray in each part of the mold.

As shown in particular on FIGS. 7 and 10, the second mounting member 6 is fitted in the two legs 18 of the strap in the first direction upwards and is pressed by said two legs directly on the vehicle body BD in said first direction Z downwards, the second mounting member 6 being immobilized by said two legs 18 in said first, second and third directions Z, X, Y on the vehicle body. In the particular example shown in the drawings, the lateral sides 19 of the second mounting member 6 are in contact with the internal faces 18a of the legs 18 and are extended outwardly by two fixing tabs 28 which are covered by the fixing tabs 20 of the legs of the strap, each fixing tab 28 including a hole 28a which is traversed by the spacer 21 of the corresponding fixing tab 20 of the strap. The fixing tabs 28 belong to the base 12 and may include clips 29 which are adapted to clips themselves on the corresponding fixing tabs 20 of the strap.

As shown in particular on FIGS. 9-12, the base of the second mounting member may be provided with clips 30 extending upwards from said base up to free ends forming hooks adapted to lock themselves on rims 31 formed on the top portion 11 of the second mounting member. Each of these clips 30 is elastically movable between a locked position where said clip secure the top portion to the base and a release portion where said clip enable separation of the top portion and the base. When the antivibration mount is assembled, the clips 30 on the two lateral sides 19 of the second mounting member are held in their locked position by the internal faces 18a of the legs of the strap, whereas the clips 30 on the rear side 33 of the second mounting member are held in the locked position by the bridge portion 25 of the strap.

The clips 30 are sufficient to maintain the top portion 11 assembled to the base 12 of the second mounting member before final assembly of the antivibration mount 1.

It should be noted that, in use, the vibratory movements of the first mounting members 5 are limited in the first direction upwards by the top 22 of the strap, in the first direction Z downwards by the bridge portion 25 of the strap, in the second direction X (both ways) by the legs 18 of the strap and in the third direction Y, away from the power train PT, by the front wall 27 of the strap.

Further, the limitation of the movements of the first mounting member 5 in the first direction Z downwards, is obtained without transmitting strong efforts to the plastic second mounting member 6, since the limitation efforts are then transmitted directly to the bridge portion 25 of the strap and from the strap to the vehicle body BD.

Figure 13:
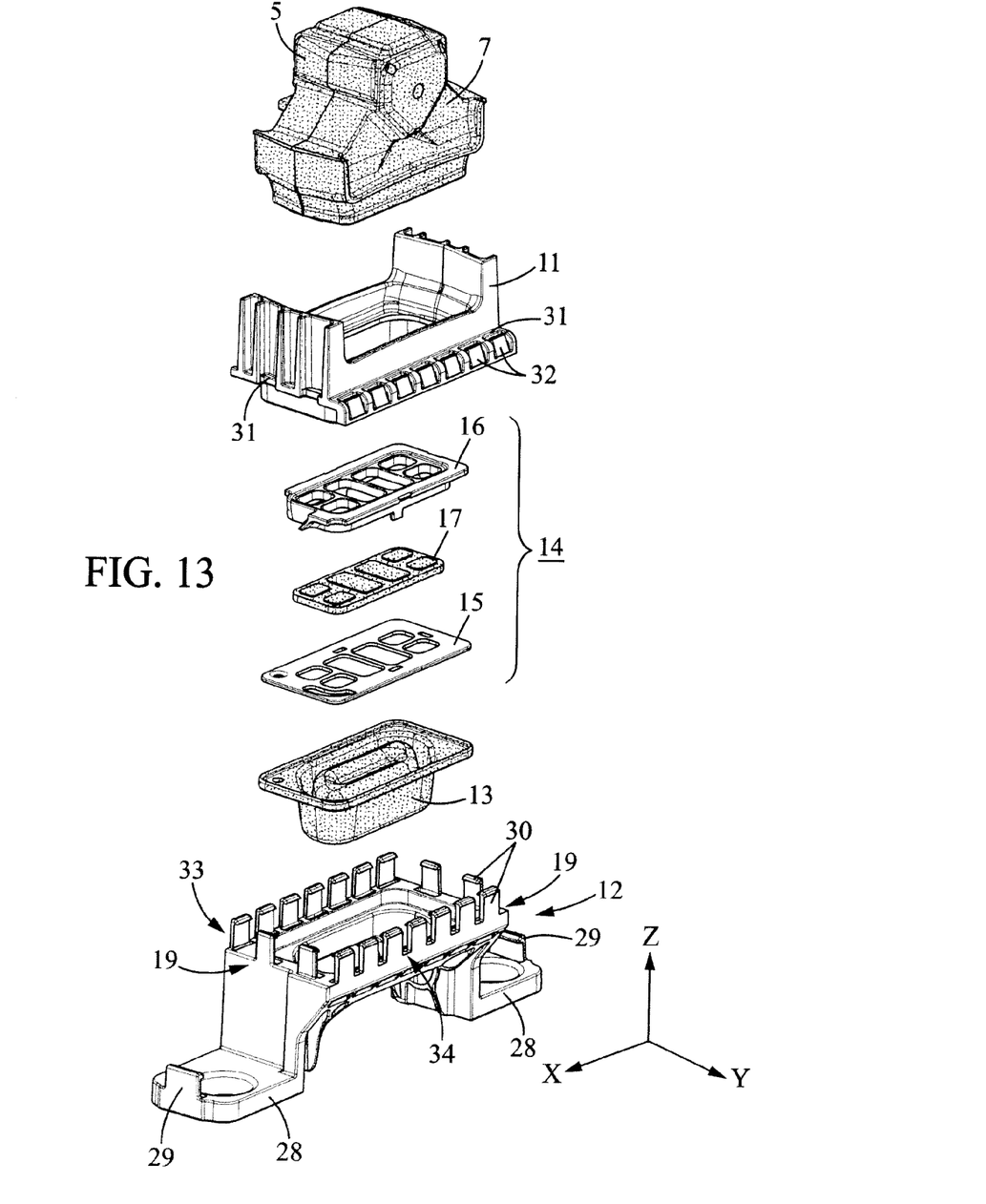
FIG. 13 is a view similar to FIG. 11, in a second embodiment of the invention.
Figure 14:
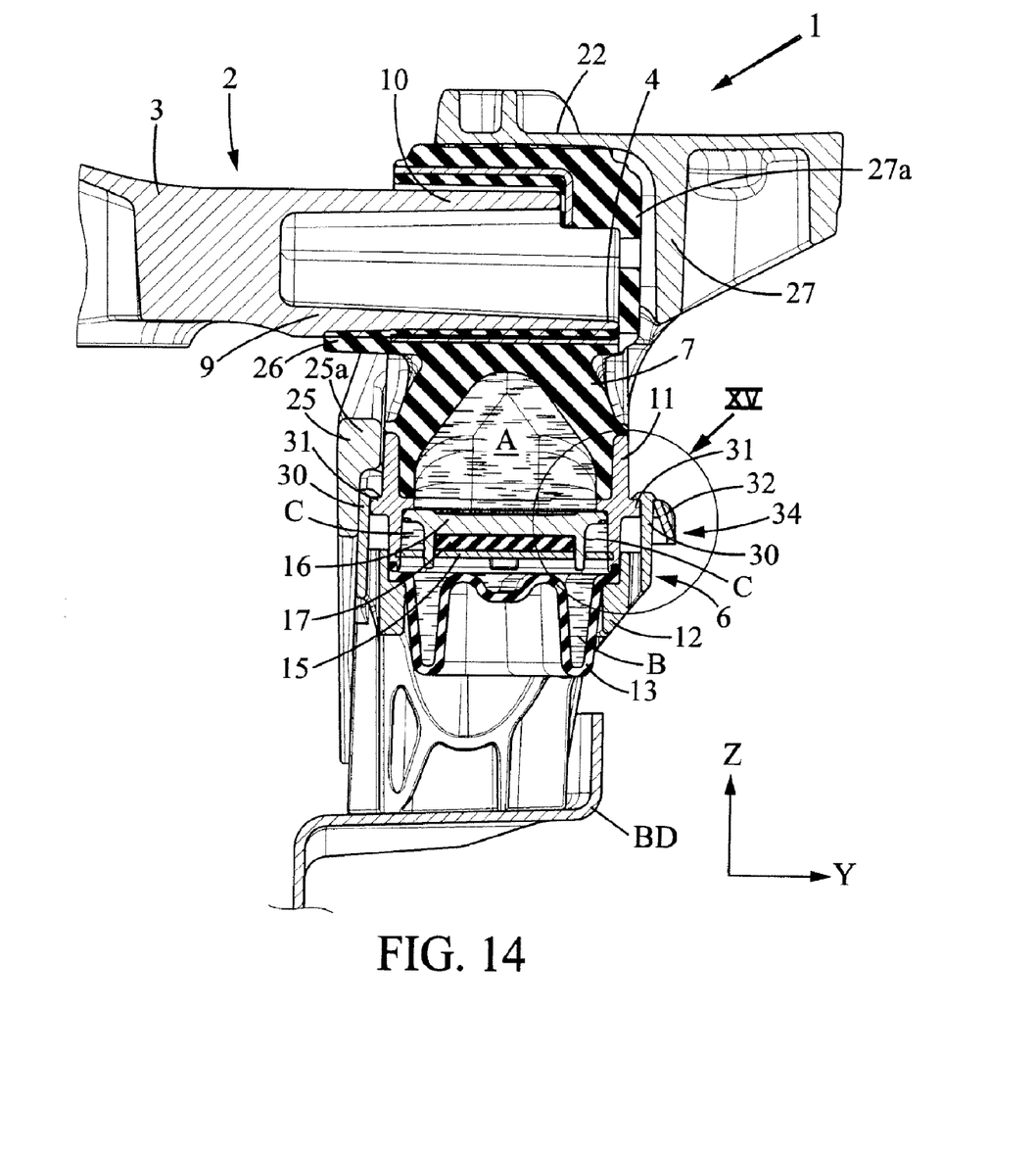
FIG. 14 is a view similar to FIG. 6, in the second embodiment of the invention.
Figure 15:
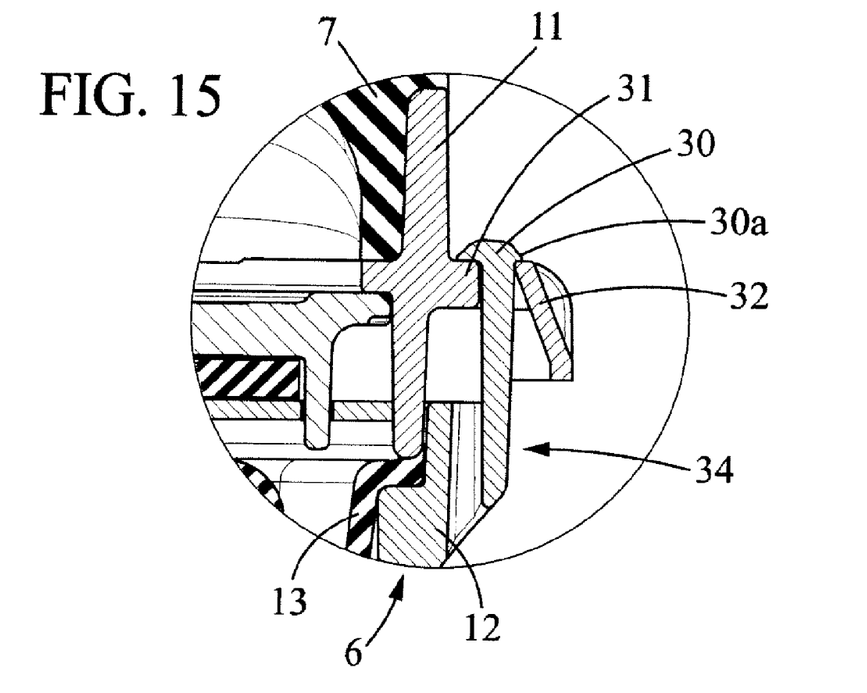
FIG. 15 is a detailed view showing detail XV of FIG. 14.

The second embodiment of the invention, shown on FIGS. 13-15, is similar to the first embodiment already described above and would therefore not be described in details hereafter.

This second embodiment mostly differs from the first embodiment in that the top portion 11 of the second mounting member includes, on the front side 34 of the second mounting member 6, elastic tongues 32 which elastically bear against the clips 30 of the base toward the corresponding rims 31 of the top portion 11. Further, as shown on FIG. 15, the elastic tongues 32 may engage themselves under a flange 30a at the upper end of the corresponding clip 30, so as to firmly secure said clip 30 in the locked position.

The invention claimed is:

1. An anti-vibration assembly including:
   a vehicle powertrain;
   a rigid bracket fixed to the vehicle powertrain and extending from the vehicle powertrain up to a free end;
   a vehicle body;
   and an anti-vibration mount connecting said vehicle powertrain and said vehicle body for the purposes of shock absorption and support, said anti-vibration mount including:
      a first rigid mounting member having a substantially tubular form, in which the bracket is received, said bracket including an intermediate portion close to the vehicle powertrain and an inserted portion which is close to the free end of the bracket and is fitted in said first mounting member;
      a second rigid mounting member fixed to the vehicle body;
      an elastomer body connecting the first mounting member to the second mounting member and capable of supporting a static load applied to the first mounting member in a first, substantially vertical direction and of allowing relative movements between the first and second mounting members at least in the first direction and in second and third directions, wherein the first, second and third directions are substantially perpendicular to each other;
      a rigid strap including at least two legs and a top joining the two legs, said two legs having respective fixing tabs which extend opposite to one another and which are fixed to the vehicle body, said first mounting member being disposed underneath the top of the strap and being capable of cooperating by abutment with said top of the strap in the first direction upwards, and said first mounting member being disposed between the two legs of the strap and being capable of cooperating by abutment with said two legs in the second direction, said two legs and top extending in the third direction between a fore rim and a rear rim,
   wherein the second mounting member is fitted in the two legs of the strap in the first direction upwards and is pressed by said two legs directly on the vehicle body in said first direction, the second mounting member being immobilized by said two legs in said first, second and third directions on the vehicle body,
   and the strap further includes a bridge portion joining the rear rims of the two legs at a distance under the intermediate portion of the bracket, said bridge being adapted to cooperate by abutment with the intermediate portion of the bracket in the first direction downwards.

2. The anti-vibration assembly according to claim 1, wherein the second mounting member is made out of plastic material.

3. The anti-vibration assembly according to claim 1, wherein the strap is adapted to be molded in a two part mold without any movable tray in each part of the mold.

4. The anti-vibration assembly according to claim 1, wherein the strap is molded out of a material chosen from aluminum based alloys and plastics.

5. The anti-vibration assembly according to claim 1, wherein the elastomer body includes a tongue of elastomer which is interposed between the intermediate portion of the bracket and the bridge of the strap.

6. The anti-vibration assembly according to claim 1, wherein the second mounting member includes a base which is pressed against the vehicle body by said strap and a top portion which is clipped to said base, said top portion of the second mounting member being at least partly overmolded by the elastomer body and bonded to said elastomer body.

7. The anti-vibration assembly according to claim 1, wherein the second mounting member defines a hydraulic working chamber with the elastomer body, an elastomer bellows is borne by the base of the second mounting member and defines a hydraulic compensation chamber, said compensation chamber being separated from the working chamber by a rigid partition which is sandwiched between the base and the top portion of the second mounting member, and said compensation chamber and working chamber being filled with liquid and communicating through a throttled passageway.

8. The anti-vibration assembly according to claim 1, wherein the second mounting member has a rear side facing the bridge of the strap, two lateral sides facing the legs of the strap and a front side opposite the rear side, the top portion being clipped to the base of the second mounting member by clips which are disposed on said rear, front and lateral sides of the second mounting member, the clips being elastically movable between a locked position where said clips secure the top portion to the base and a release position where said clips enable separation of the top portion and the base, and the clips of the rear and lateral sides being held in the locked position respectively by the bridge and legs of the strap.

9. The anti-vibration assembly according to claim 1, wherein
clips of the front side are held in a locked position by elastic tongues belonging to the second mounting member.

10. The anti-vibration assembly according to claim 9, wherein said elastic tongues engage under a flange belonging to said clips of the front side.

11. The anti-vibration assembly according to claim 1, wherein the strap has a front wall facing the free end of the bracket and the elastomer body has a front elastomeric stop interposed between the free end of the bracket and the front wall of the strap, whereby the bracket can come in abutment against the front wall of the strap with interposition of the front elastomeric stop in the third direction.

* * * * *